United States Patent
Huber et al.

(10) Patent No.: US 6,661,973 B1
(45) Date of Patent: Dec. 9, 2003

(54) OPTICAL TRANSMISSION SYSTEMS, APPARATUSES, AND METHODS

(76) Inventors: David R. Huber, 8320 Guilford Rd., Glenwood, MD (US) 21046-9400; Alistair J. Price, 8320 Guilford Rd., Columbia, MD (US) 21046-9400

(*) Notice: Subject to any disclaimer, the term of this patent is extended or adjusted under 35 U.S.C. 154(b) by 0 days.

(21) Appl. No.: 09/326,748

(22) Filed: Jun. 4, 1999

(51) Int. Cl.[7] .............................................. H04J 14/02
(52) U.S. Cl. ......................... 398/91; 398/76; 398/141; 398/163
(58) Field of Search ......................... 359/133, 191, 359/176, 174, 180, 190

(56) References Cited

U.S. PATENT DOCUMENTS

| | | | |
|---|---|---|---|
| 4,646,361 A | 2/1987 | Usui | 455/601 |
| 4,736,464 A | 4/1988 | Tanson | 455/608 |
| 4,807,227 A | 2/1989 | Fujiwara et al. | 370/3 |
| 5,055,795 A * | 10/1991 | Kasper et al. | 330/54 |
| 5,134,509 A | 7/1992 | Olshansky et al. | 398/76 |
| 5,239,401 A | 8/1993 | Olshansky et al. | 395/194 |
| 5,267,073 A | 11/1993 | Tamburello et al. | 359/179 |
| 5,349,463 A * | 9/1994 | Hirohashi et al. | 359/174 |
| 5,452,115 A | 9/1995 | Tomioka | 359/123 |
| 5,467,212 A | 11/1995 | Huber | 398/168 |
| 5,504,609 A | 4/1996 | Alexander et al. | 398/91 |
| 5,596,436 A | 1/1997 | Sargis et al. | 398/76 |
| 5,784,184 A | 7/1998 | Alexander et al. | 359/125 |
| 5,801,858 A * | 9/1998 | Roberts et al. | 359/114 |
| 5,896,211 A * | 4/1999 | Watanabe | 359/124 |
| 6,118,566 A | 9/2000 | Price | 398/194 |
| 6,222,658 B1 * | 4/2001 | Dishman et al. | 359/172 |

OTHER PUBLICATIONS

"SONET Regenerator (SONET RGTR) Equipment Generic Criteria", Dec. 1990, Bellcore Technical Reference, TR-NWT-000917, Issue 1.

Diner, F., et al., "Network Design Considerations of n-Channel WDM Architectures with EDFAs For Central Office Applications", Jun. 18-22, 1995, National Fiber Optic Engineers Conference, pp. 1207-1214, Boston, MA USA.

Aoki, Y., et al., "Unrepeatered Transmission of Four-Channel 2.5 Gb/s WDM Signal over 360km of Conventional Fiber with Fully-Engineered Equipments", Dec. 3-6, 1995, 20th Australian Conference on Optical Fibre Technology (ACOFT '95), Coolum Beach, Queensland, Australia.

Thombley, L., et al., "Project OART—WDM, EDFA's and Mixed Data Rates in a Real-World Testbed", NFOEC '94, pp. 283-294.

* cited by examiner

*Primary Examiner*—Jason Chan
*Assistant Examiner*—Christina Y Leung (57) ABSTRACT

An optical transmission system of the present invention includes at least one transmitter configured to receive information from a plurality of optical receivers and transmit the information in a plurality of information carrying optical signal wavelengths. At least one optical receiver is configured to receive a plurality of information carrying optical signal wavelengths and a local oscillator signal. The optical receiver converts a plurality of optical signal wavelengths into a corresponding number of electrical signal frequencies. The optical systems reduce the number of transmitters and receivers required interconnecting various optical systems, as well as providing multiple wavelength regenerators and converters and add/drop devices with increased capacity and system flexibility.

12 Claims, 6 Drawing Sheets

OPTICAL TRANSMISSION SYSTEMS, APPARATUSES, AND METHODS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed generally to communication networks and systems. More particularly, the invention relates to optical WDM systems and optical components, such as add/drop devices, employing multiple wavelength detection and processing.

Optical communication systems transport information by generating optical signals corresponding to the information and transmitting the optical signals through optical transmission fiber. Information in various formats, such audio, video, data, or any other formats can be optical transported through many different networks, such as local and long distance telephone, cable television, LAN, WAN, and MAN systems, as well as other communication networks.

Optical systems can be operated over a broad range of frequencies/wavelengths, each of which is suitable for high speed data transmission and is generally unaffected by conditions external to the fiber, such as electrical interference. Also, information can be carried using multiple optical wavelengths that are combined using wavelength division multiplexing ("WDM") techniques into one optical signal and transmitted through the optical systems. As such, optical fiber transmission systems have the potential to provide significantly higher transmission capacity at a substantially lower cost than electrical transmission systems.

However, optical transmission systems are not free from various forms of degradation that limit the performance of the systems. For example, optical fiber is not a perfect transmitter of electromagnetic radiation in the optical spectrum. Thus, the intensity of an optical signal is attenuated as it travels through the fiber, due to diffraction from fiber material imperfections and other degradation mechanisms. Furthermore, optical noise from signal attenuation and optical components in the system will accumulate and propagate in the fiber, and chromatic dispersion and nonlinear signal interactions will degrade the quality of the signal. In addition, optical systems are generally not operated in the identical manner or using a common set of wavelengths that would facilitate optical transmission across interfaces between optical systems.

It is therefore necessary to regenerate optical signals being transmitted through the optical system to overcome the three primary limitations on optical transport, namely: 1) optical signal attenuation, 2) optical signal degradation, and 3) optical system interconnectivity. The regeneration of optical signals can be performed either optically or electrically.

In early optical communication systems, there was no commercially viable method of optically amplifying or regenerating optical signal to compensate for signal attenuation. Therefore, optical signals had to be electrically regenerated by converting the optical signal into an electrical signal, while the signal intensity was sufficiently high and the optical noise sufficiently low that the signal could be detected. The electrical signal would then be amplified, further processed, if desired, converted back to an optical signal and transmitted through the next span of fiber. Electrical regenerators of this type are commonly referred to as 3R (reshape, retime, regenerate) repeaters.

The general configuration of a 3R repeater includes a number of optical receivers electrically connected to a corresponding number of optical transmitters. The number of receiver/transmitter pairs corresponding to the number of wavelengths used in the optical system.

The optical receivers generally include optical to electrical converters, such as a photodiodes, configured to receive an information carrying wavelength from the optical fiber and provide a corresponding information carrying electrical signal. Electrical amplification, and other processing, such as retiming, reshaping, electrical add/drop multiplexing and demultiplexing, etc. are performed on the electrical signal as necessary.

The optical transmitter converts the regenerated electrical signal into an optical signal and transmits the optical signal into the next optical fiber span. The electrical to optical conversion at the transmitter is typically performed by either directly or externally modulating an optical signal laser with the regenerated electrical signal. Electrical regenerators are well known in the art, for example, see U.S. Pat. Nos. 5,504,609; 5,267,073; 4,663,596; 4,549,314; 4,313,224; 4,307,469; 4,295,225; 4,234,970; 4,075,474; 4,019,048; 4,002,896; and, 3,943,358.

Electrical regeneration of the optical signals generally as required every 30–40 km to compensate for signal attenuation and signal degradation. Therefore, in order to span distances in excess of 30–40 km between an origin and a destination, it was necessary to serially connect fiber spans and electrical regenerators. The cost of frequent regeneration limited most early optical systems to operation using a single wavelength.

While frequent electrical regeneration greatly increases the overall transmission cost, the use of electrical regenerators does allow for each optical fiber span to be operated optically independent of the other spans. Accordingly, the wavelength of the optical signal used in each span could be varied depending upon the transmission characteristics of each span.

For example, many early and current optical systems operate in the 1300 nm range to minimize the degradation of the optical signal due to chromatic dispersion that occurs in the optical fibers. While other optical systems are operated in the 1550 nm range, which minimizes the optical signal attenuation in the fiber.

Electrical regeneration of optical signals to interface with another optical systems is generally performed as part of the electrical regeneration performed to compensate for signal attenuation and/or degradation. In this manner, the optical links can be established to minimize the number of regeneration points required between the signal origin and destination.

The advent of optical amplifiers, semiconductor and Erbium doped optical amplifiers, or EDFAs, provided a means to optically regenerate the optical signal to compensate for fiber attenuation of the optical signal. It was therefore possible to replace electrical regenerators used to compensate for fiber attenuation in the optical system, as discussed in U.S. Pat. No. 4,947,134 issued to Olsson et al.

A difficulty with optical amplified systems is that optical noise accumulates in the fiber and chromatic dispersion and non-linear interactions degrade the signal quality as the signal propagates in the fiber. The increasing noise levels and signal degradation produce a corresponding increase in the bit error rate of the system. As such, while the optical amplifiers have greatly reduced the need for electrical regeneration, optical systems still require electrical regeneration to eliminate accumulated optical noise and maintain signal quality, as well as interface with other optical systems.

A further advantage of optical amplifiers over electrical regenerators is that a plurality of wavelengths can be optically amplified at one time with only minimal additional expense. The primary additional expense is the cost of providing optical energy, i.e., pump power, to the optical amplifier, which increases with the number of wavelengths and/or the gain of the amplifier.

The ability of optical amplifiers to optically regenerate optical signals over a range of wavelengths has dramatically decreased the number of electrical regenerators required in optical systems. The reduction in electrical regeneration requirement has dramatically increased the commercial viability of WDM systems as a cost effective means of adding capacity to optical systems.

However, the number of wavelengths used in a WDM system is limited to specific wavelength range in which the optical amplifiers can amplify optical signals. The number of channels is also limited by the spacing of the wavelength channels in the WDM system.

The channel spacing in optical systems is limited by a number of factors, one of which is the modulation technique used in the optical transmitter. For example, direct modulation of the laser is the most cost effective technique for imparting information onto a carrier wavelength, because it avoids the need and the expense of an external modulator for each wavelength in the system. However, at high bit transmission rates, direct modulation result in excessive linewidth broadening and wavelength instability which limits the wavelength spacing in WDM systems.

In early WDM systems, the wavelength spacing was also limited, in part, by the ability to effectively separate wavelengths from the WDM signal at the receiver. Most optical filters in early WDM systems employed a wide pass band filter, which effectively set the minimum spacing of the wavelengths in the WDM system.

The development of effective optical filters, namely in-fiber Bragg gratings, has provided an inexpensive and reliable means to separate closely spaced wavelengths. The use of in-fiber Bragg grating has further improved the viability of WDM systems by enabling direct detection of the individually separated wavelengths. For example, see U.S. Pat. No. 5,077,816 issued to Glomb et al.

A shortcoming of direct detection electrical regenerators schemes in WDM systems is that an optical filter and receiver combination must be provided for each wavelength. For example, see U.S. Pat. Nos. 5,063,559 and 5,504,609. Therefore, the cost of electrical regenerators in WDM systems increases in direct proportion to the number of wavelengths being used in the WDM point to point system.

Also, it is an industry desire to establish optical networks in which communications traffic can be flexibly accessed at points in the system other than terminals at which the optical signals are regenerated to compensate for optical noise. Therefore, the number of filters and receivers required in WDM networks and associated cost will have to be dramatically increased to provide the desired functionality.

However, the continued development of communications technology is dependent upon the continuing reductions in the cost of transmitting information. Thus, it is imperative that optical systems be developed that provide the increased flexibility required in next generation optical systems, but in a more cost-effective and upgradable manner that previously available in the industry.

BRIEF SUMMARY OF THE INVENTION

The systems, apparatuses, and methods of the present invention address the above demand for improved optical systems. An optical transmission system of the present invention includes at least one transmitter configured to receive information from a plurality of optical receivers and transmit the information in a plurality of information carrying optical signal wavelengths. At least one optical receiver is configured to receive a plurality of information carrying optical signal wavelengths and a local oscillator signal. The optical receiver converts a plurality of optical signal wavelengths into a corresponding number of electrical signal frequencies.

In a number of embodiments, the optical receiver is used in combination with one or more second optical transmitters to provide a multiple signal wavelength regenerator. In various embodiments, the receiver/transmitter pair can be operated at the same or different optical signal wavelengths to provide optical signal regeneration or wavelength conversion between optical systems. In addition, tunable local oscillator and transmitters can be employed to provide an optical system having flexible wavelength allocation.

In various embodiments, one or more add/drop devices can be used in combination with the receivers to convert information carrying optical signal wavelengths into corresponding electrical signal frequencies. The add/drop devices can be configured to convert the optical signal wavelengths to electrical signal frequencies for use in other electrical or optical systems. The add/drop devices can also be used to interconnect sections of two optical systems, such as a ring to a trunk line.

In WDM systems of the present invention, multiple information carrying electrical signal frequencies can be separated and used to directly or externally modulate an optical source in the second optical system. In other embodiments, the multiple signal frequencies can be upconverted using a single optical source/transmitter, thereby decreasing the number of transmitters, as well as receivers, used in the system.

Accordingly, the present invention addresses the aforementioned problems and provides apparatuses and methods to increase the efficiency and capacity of optical communication systems without commensurate increases in the cost of optical components. These advantages and others will become apparent from the following detailed description.

BRIEF DESCRIPTION OF THE DRAWINGS

Embodiments of the present invention will now be described, by way of example only, with reference to the accompanying drawings for the purpose of illustrating present embodiments only and not for purposes of limiting the same, wherein like members bear like reference numerals and:

FIGS. 5–6(a&b) depict exemplary optical add/drop devices.

DETAILED DESCRIPTION OF THE INVENTION

Figure 1:
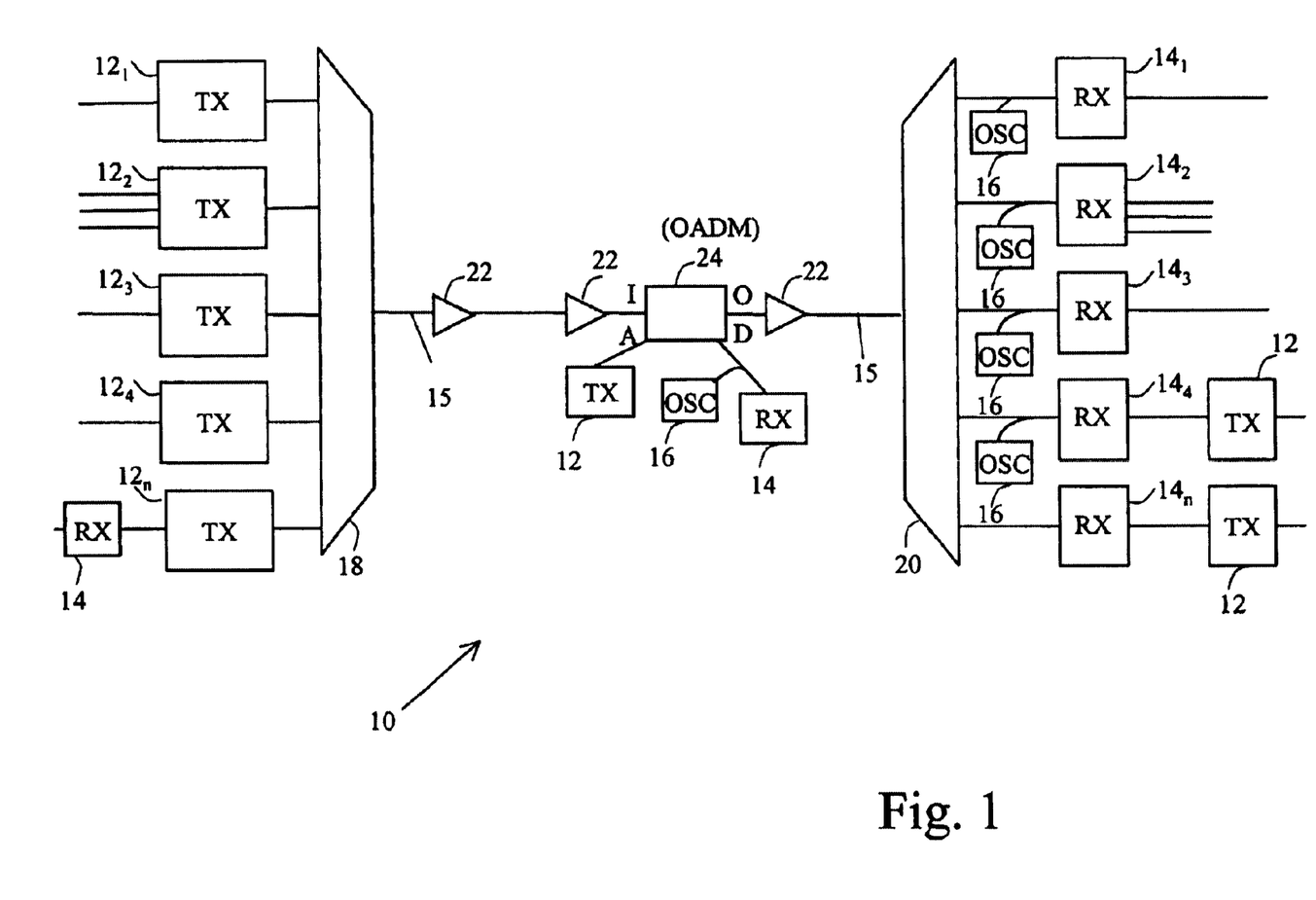
FIGS. 1–2 depict exemplary optical communication systems.

The optical system 10 generally includes at least one optical transmitter 12 in optical communication with at least one optical receiver 14 via an optical transmission waveguide 15, such as optical fiber, as shown in FIG. 1. Each transmitter 12 is configured to transmit information via one or more information carrying optical signal wavelengths, or channels, $\lambda_i$, "signal wavelengths" that be combined into a wavelength division multiplexed ("WDM") optical signal. As used herein, the term "information" should be broadly construed to include any type of audio or video signal, data, instructions, etc. that can be transmitted as optical signals.

The transmitter 12 will generally include a laser as an optical source, but may include one or more other coherent or incoherent optical sources as is known in the art. In addition, the optical source in the transmitter can be tunable to provide flexible wavelength allocation in the system 10.

At least one of the optical receivers 14 is configured to receive the optical signal and a local oscillator wavelength $\lambda_{LO}$ from a local optical source 16. The optical receiver 14 down-converts two or more of the optical signal wavelengths $\lambda_i$ to corresponding electrical signal frequencies $v_i$, which can be further processed as may be appropriate in the system 10.

Similar to the transmitter 12, the local optical source 16 can also be tunable to provide further flexibility in wavelength allocation and detection. The tunable local optical source 16 and transmitter 12 can include temperature or external cavity tuned semiconductor or fiber lasers, as well as other tunable sources known in the art.

The local oscillator wavelength $\lambda_{LO}$ may be combined with the optical signal wavelengths $\lambda_i$ proximate to the receiver 14, at the transmitter 12, or along the fiber 15. It will be appreciated that introducing the local oscillator wavelength $\lambda_{LO}$ proximate to the receiver 14 will maximize the local oscillator power available for coherent detection of the optical signal wavelengths $\lambda_i$. The system 10 may also include optical receivers 14 that include wavelength selective devices, i.e. Bragg gratings, etc., to provide for direct detection of the individual signal wavelengths $\lambda_i$.

In the present invention, the transmitters 12 and receivers 14 can interface with other optical or electrical transmission systems as shown in FIG. 1 to reduce the number of transmitters and receivers used in the optical systems. The strategic use of direct and coherent detection receivers 14 in combination with modulating and upconverting transmitters 12 allows the transmission capacity to be cost-effectively deployed in a hybrid transmission system 10. For example, upconverting transmitters 12 and coherent detection receivers 14 can be used in the present invention to interconnect intensity modulated direct detection (IMDD) systems of the prior art. Depending upon the distance between the IMDD systems, it may also be desirable to employ the transmitters 12 and receivers 14 of the present invention in a regenerator configuration.

The receivers 20 can interface with transmitters in other systems directly, via electrical or optical cross-connects, ATM or IP routers, SONET/SDH add/drop multiplexers and short reach interfaces, or other protocols and interfaces. It will be further appreciated that systems 10 of the present invention can be interfaced with one or more other optical systems operating at the same or different wavelengths or wavelength ranges, i.e., 1300 and 1550 nm range.

Figure 2:
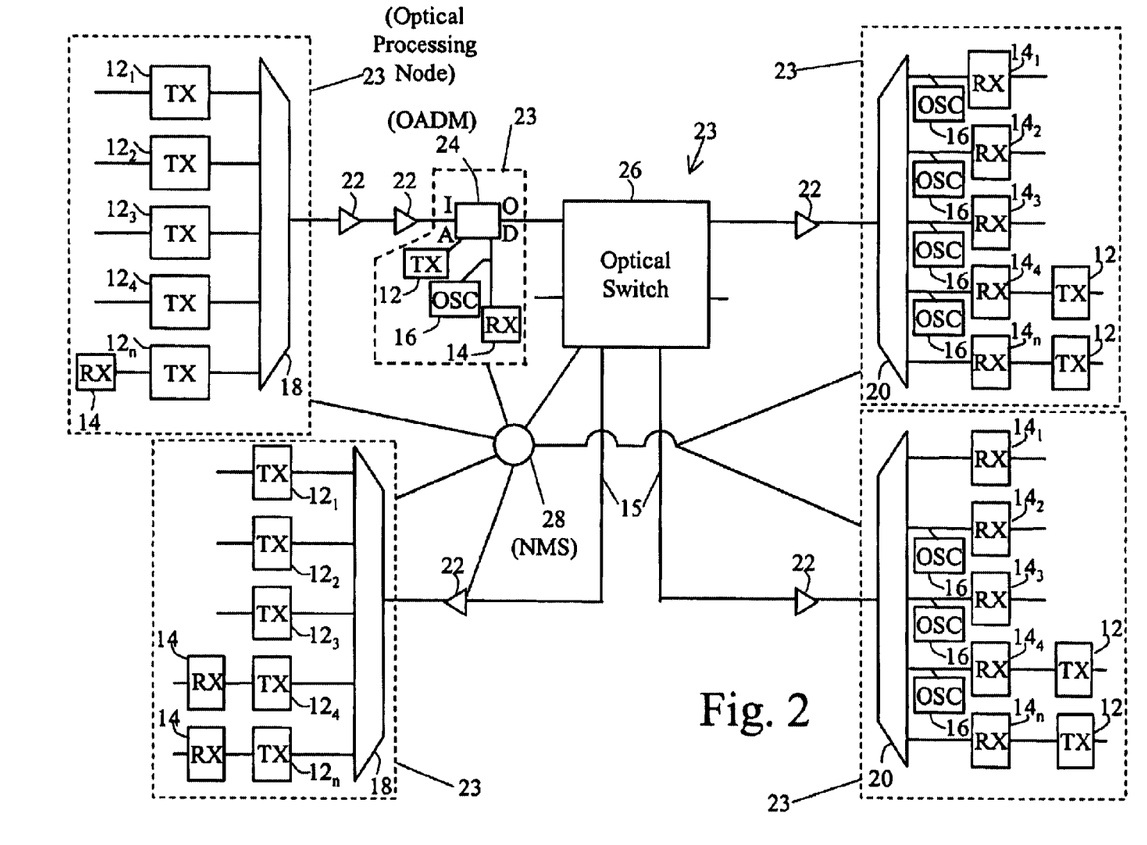

As shown in FIGS. 1 and 2(a), a plurality of transmitters 12 and receivers 14 can be employed in the system 10 by including one or more optical combiners 18 and optical distributors 20. The combiners 18 and distributor 20 can be wavelength selective or non-selective, fiber or free space devices provided in one or more stages of varying bandwidths. For example, passive and WDM coupler and splitters, circulators and reflective element combinations, dichroic and other filters, as well as other multiplexers and demultiplexers can be deployed in various stages as may be necessary. Optical amplifiers 22 can also be provided to overcome losses associated with the combiners 18 and distributors 20.

In optical systems 10 having sufficiently long fiber spans, one or more optical amplifiers 22 can be deployed along the span to optical regenerate the optical signal wavelengths $\lambda_i$ to overcome signal attenuation. The optical amplifiers 22 can be remotely monitored and controlled using a supervisory channel by providing appropriate circuitry at the amplifier site as is known in the art. It will be appreciated that the present invention can be deployed in either unidirectional or bi-directional systems with appropriate modification to the combiners 18, distributors 20, amplifiers 22, and other components within the system 10.

The optical amplifiers 22 used in the present invention can include doped fiber, such as erbium, and Raman fiber amplifiers, as well as other optical amplifiers known in the art. It is generally desirable to employ optical amplifiers 22 having substantially flat gain profiles over the range of information carrying signal wavelengths $\lambda_i$. The fiber amplifiers can be either locally or remotely pumped with optical energy depending on the system configuration.

As shown in FIG. 2, optical processing nodes 23 can also be disposed along the transmission fiber 15 and include optical add/drop devices 24 and transparent or opaque optical switches/routers 26, in addition to transmitters 12 and receivers 14. In various embodiments, it may be desirable to provide for transparent optical routing between the nodes 23 in the system 10. In such embodiments, the add/drop devices 24 and switch/routers 26 can interconnect the nodes 23 using various techniques, such as those disclosed in commonly assigned U.S. patent application Ser. No. 09/119,562, which is incorporated herein by reference. The nodes 23 and amplifier 22 can be controlled either directly by a network manager 28 or remotely through other nodes 23 or amplifiers 22 via the supervisory channel.

Figure 3A:
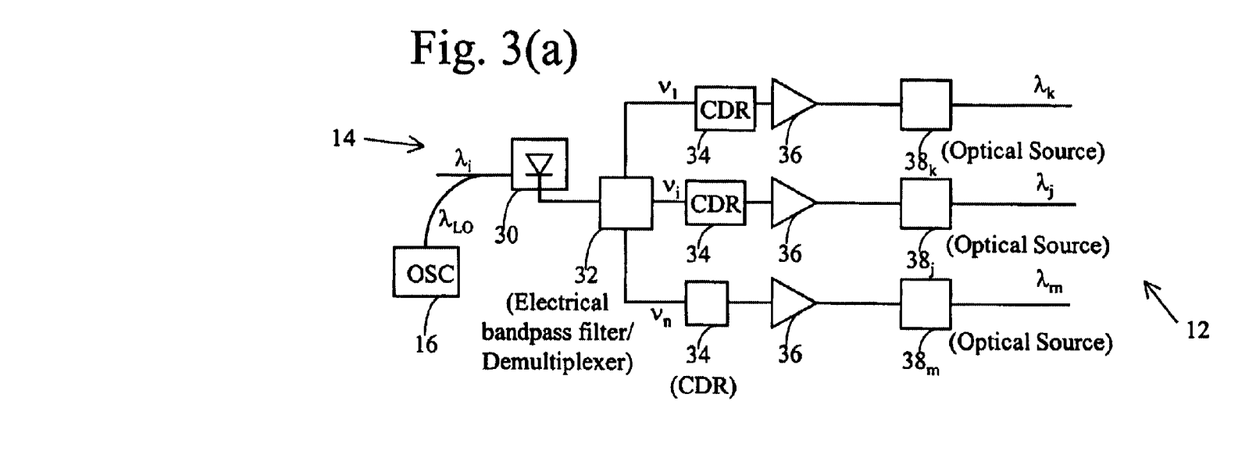
FIGS. 3(a)–3(c) depict exemplary regenerators.
Figure 3B:
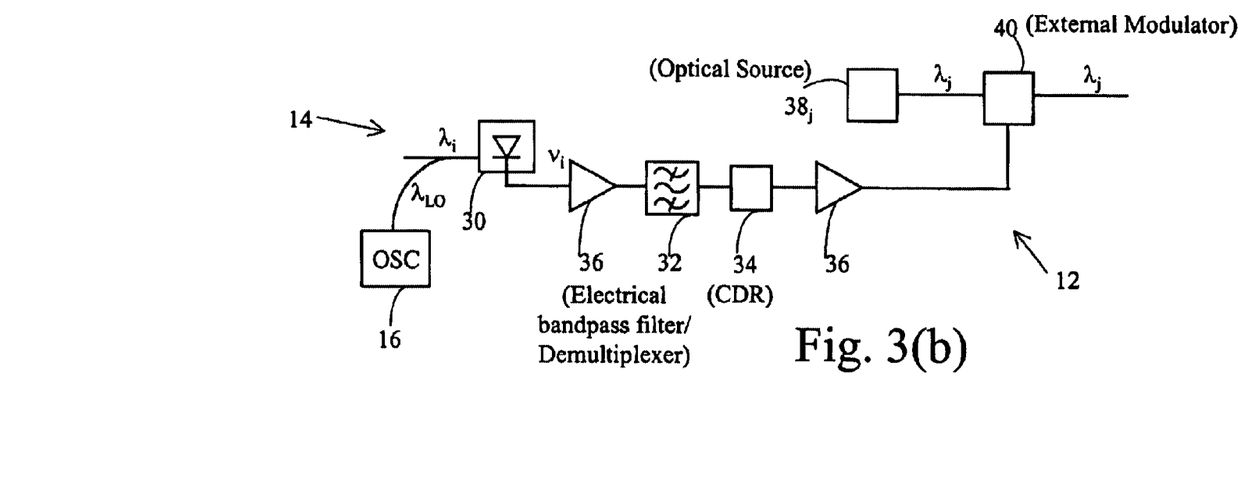
Figure 3C:
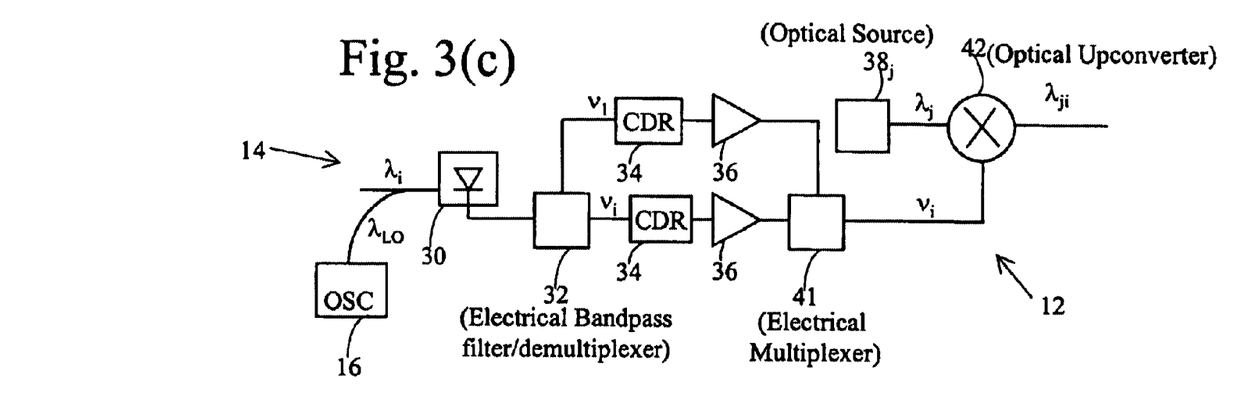

In an embodiment shown in FIG. 3, information is transmitted on a plurality of signal wavelengths $\lambda_i$ within a frequency bandwidth of electrical circuitry in the optical receiver 14. The information can be transmitted on wavelengths $\lambda_i$ provided by a single transmitter and/or a plurality of transmitters providing optical wavelengths within the frequency bandwidth of the receiver electronics.

In various receiver embodiments, a photodiode 30 can be used in combination with the local oscillator wavelength $\lambda_{LO}$ provided by the local optical source 16 to frequency downconvert the information carried by the optical signal wavelengths $\lambda_i$ onto corresponding electrical signal frequencies $v_i$ within the frequency bandwidth of the receiver circuitry. Suitable receiver/local source combinations for coherent detection are known in the art; for example, see U.S. Pat. Nos. 4,989,200 and 5,432,632, which are incorporated herein by reference.

The receivers 14 can include electrical filters and/or demultiplexers 32 to separate the multiple electrical signal frequencies, which can be passed through electrical signal processing circuits 34 to process, i.e. retime and reshape, the signals. The processed electrical signals $v_i$ will typically be further amplified using an electrical amplifier 36 before being provided to another optical or electrical system.

In embodiments shown in FIGS. 3(*a–c*), the electrical output from the receiver 14 is provided as input to another optical system. In FIG. 3(*a*) embodiments, information carried by the electrical signal frequencies can be used to directly modulate one or more optical sources $38_{j,k,\&\ m}$, such as lasers, to provide modulated optical signals at the optical source wavelengths $\lambda_{j,k,\&\ m}$. Similarly, in FIG. 3(*b*) embodiments, the information carried by the electrical signal frequencies can be used to drive external modulators 40, which modulate the information onto the optical wavelengths $\lambda_j$ supplied by respective optical sources $38_j$.

In embodiments shown in FIG. 3(*c*), one or more information carrying electrical signal frequencies $v_i$ can be multiplexed using an electrical multiplexer 41 and provided to an optical upconverter 42. The upconverter 42 combines the electrical signal frequencies $v_i$ with the optical carrier $\lambda_j$ to produce optical signals at different wavelengths $\lambda_{ji}$ corresponding to the electrical signal frequencies $v_i$.

In various receiver/transmitter combinations, the transmitter 12 can transmit optical wavelengths $\lambda_j$ that are the same as, or different than, the optical wavelengths $\lambda_i$ received by the receiver 14. In this manner, the receiver/transmitter combination can be employed as an optical signal regenerator and/or a wavelength converter. In various embodiments, it is desirable for the receiver and/or the transmitter to be tunable, either separately or in combination, to allow the network management system 28 to flexibly allocate the wavelengths used in the system 10.

Figure 4:
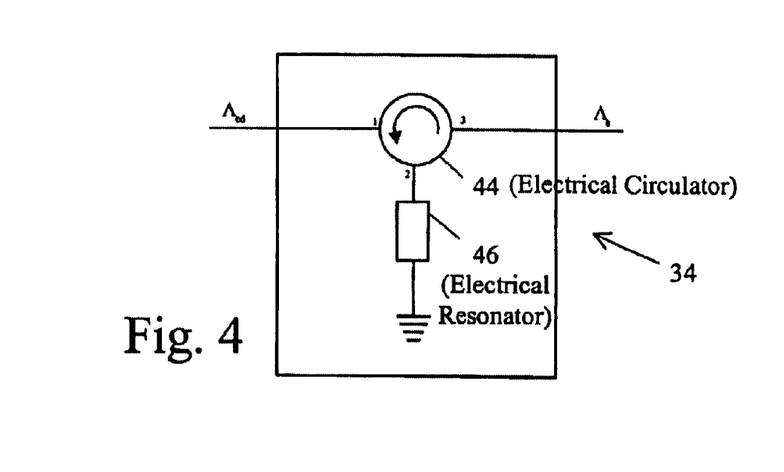
FIG. 4 depicts an exemplary distortion compensating processing circuit.

In the present invention, the electrical processing circuit 34 can be further configured to compensate for optical signal distortion that occurs during optical transmission. For example, the processing circuit 34 can include a group delay equalizer (FIG. 4) configured to compensate for chromatic dispersion or other optical distortion of the signal wavelength $\lambda_i$ during transmission in the fiber 15. In FIG. 4 embodiments, one or more electrical circulators 44 are provided in combination with resonators 46 to compensate for distortion in a distorted electrical signal $\Lambda_{ed}$ and provide an undistorted electrical signal $\Lambda_e$. Such techniques are described in commonly assigned copending application U.S. Ser. No. 09/185,821, which is incorporated herein by reference. The distortion compensation can be performed either on the electrical signal frequencies $v_i$ or following conversion to a baseband electrical signal carrying the information.

Figure 5:
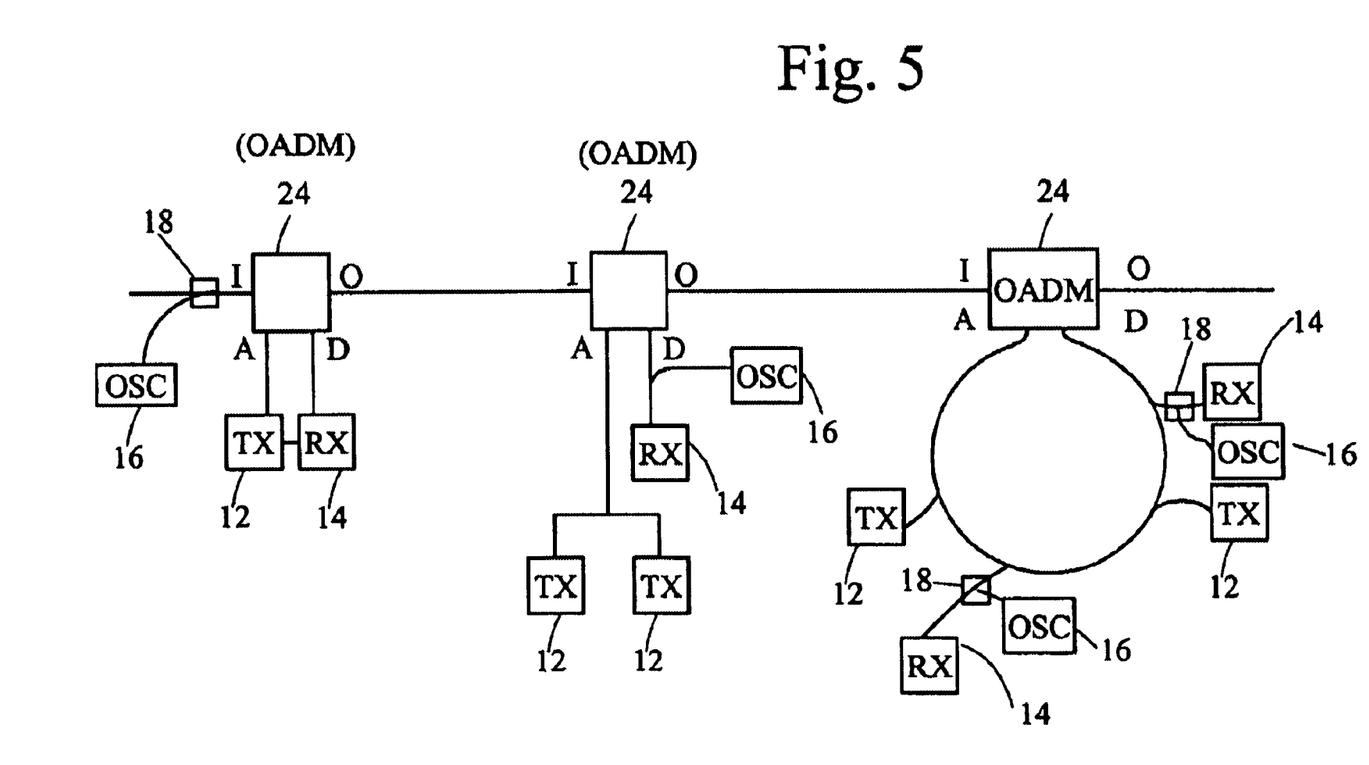

In various embodiments, optical add/drop devices 24 are provided along the length of the fiber 15 in a number of configurations shown in FIG. 5. One or more receivers 14 and local optical sources 16 are provided in optical communication with the devices 24 to receive a plurality of drop signal wavelengths. Embodiments employing tunable local optical sources 16 provide for high capacity, flexible add/drop devices 24 for deployment in the system 10.

In the present invention, the add/drop devices 24 can also be used to provide full 2×2 switch or limited fixed wavelength add/drop functionality in the system 10. In general, the add/drop device 24 receives an input optical signal from the transmission fiber $15_1$ at a first input port I. The input signal is distributed via a first continue path $15_{c1}$ to a first output port O and/or a drop path $15_D$ to a second output, or drop, port D. Likewise, optical signals from a second transmission fiber $15_2$ are provided to the device 24 through a second input, or add, port A. The second input signal is provided via add path $15_A$ to the output port O and may also be distributed to the drop port D via second continue path $15_{c2}$. Wavelength selective or non-selective combiners and distributors can be used at the output ports and input ports depending upon the desired functionality of the add/drop device 24, as previously described.

In various embodiments, the transmitters 12 and receivers 14 used in the add/drop devices 24 can be interconnected to form a non-terminal regenerator to overcome signal degradation or a wavelength converter in the system 10 (FIG. 5). The add/drop devices can also optically terminate the traffic or provide an interface with another optical system, such as a local ring, as further-shown in FIG. 5.

Figure 6A:
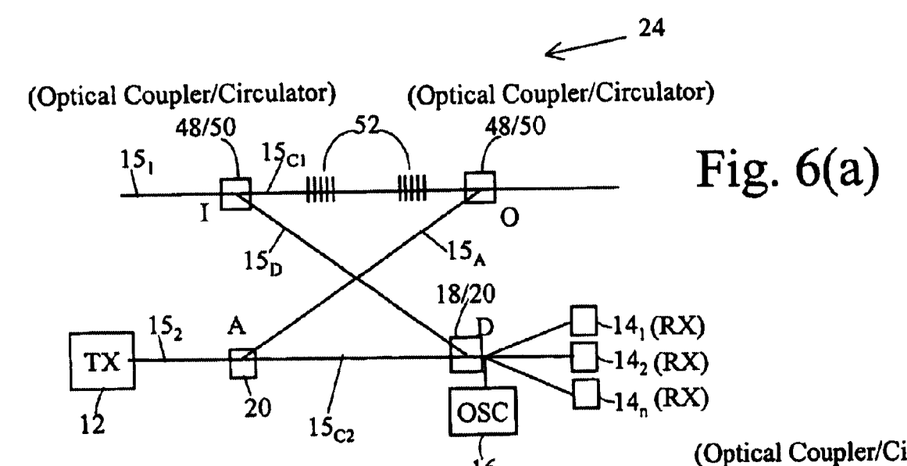
Figure 6B:
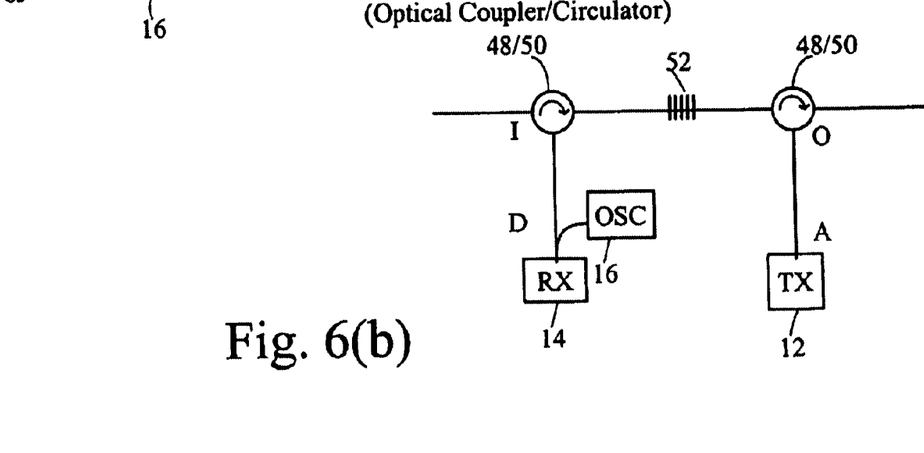

In an embodiment, the add/drop device 24 can be configured as a 2×2 switch device employing couplers 48 and circulators 50 in combination with fiber Bragg gratings 52, or other wavelength selective filters, to selectively pass wavelengths between the ports (FIG. 6(*a*)). Depending upon the system capabilities, it may be desirable to block wavelengths in the continue paths $15_c$ to allow for wavelength reuse. Tunable or transient Bragg gratings 52 can be deployed in the continue paths $15_{C1\&2}$ in combination with the tunable receiver 14 to provide additional flexibility and wavelength reuse capability. The receiver 14/local source 16 combinations can also be deployed with fixed wavelength add/drop devices 24 (FIG. 6(*b*)), using circulators 50 or couplers 48 alone or in combination with gratings 52 or other wavelength selective elements. The local optical source 16 can be tuned to or fixed at the wavelength of the reflective elements to provide for coherent detection of the selectively dropped signal wavelengths.

As can be seen, the present invention provides for increased transmission capacity without the commensurate increase in equipment cost and complexity that is present in the prior art systems. Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical transmission system comprising:
    a plurality of first optical transmitters configured to transmit information via a WDM signal including a plurality of first information carrying optical signal wavelengths;
    a local oscillator optical source configured to supply a local oscillator wavelength;
    a first optical receiver configured to receive the WDM signal and the local oscillator wavelength and convert the information carried by at least two of the first optical signal wavelengths into corresponding information carrying electrical signal frequencies;
    at least one second optical transmitter configured to transmit at least a portion of the information carried by at least two of the corresponding electrical signal frequencies via corresponding second information carrying optical signal wavelengths; and
    an electrical demultiplexer configured to separate and provide the plurality of information carrying electrical signal frequencies to a corresponding plurality of said at least one second optical transmitters.

2. The system of claim 1, wherein the second optical signal wavelengths differ from the first optical signal wavelengths.

3. The system of claim 1, wherein at least one of said first transmitters is configured to transmit information via plurality of first signal wavelengths.

4. The system of claim 1, wherein said at least one second transmitter is configured to transmit information via plurality of second signal wavelengths.

5. The system of claim 1, wherein said local optical source includes a laser.

6. The system of claim 1, wherein said plurality of first optical transmitters are configured to transmit a plurality of information carrying signal wavelengths.

7. The system of claim 1, wherein said first optical receiver is further configured to electrically distort the information carrying electrical signal frequencies to compensate for optical distortion of the first information carrying optical signal wavelengths.

8. The system of claim 1, wherein said local optical source includes a wavelength tunable local optical source.

9. The system of claim 1, wherein said at least one second optical transmitter is configured to upconvert the plurality of information carrying electrical signal frequencies onto a corresponding plurality of second information carrying signal wavelengths differing from the plurality of first information carrying signal wavelengths.

10. The system of claim 1, wherein said system includes a plurality of second optical receivers configured to provide information to said plurality of first optical transmitters.

11. The system of claim 10, wherein each of said plurality of first optical transmitters is provided with information from a plurality of said first optical receivers.

12. The system of claim 1, wherein said first optical receiver is one of a plurality of first optical receivers, at least one of which is configured to directly detect one of the first signal wavelengths.

* * * * *